United States Patent Office 3,383,184
Patented May 14, 1968

3,383,184
PROCESS FOR THE PRODUCTION OF
HYDRIDES OF Ti, Zr AND Th
Harry Kloepfer, Frankfurt am Main, Helmut Knorre, Hainstadt am Main, and Karl Stephan, Frankfurt am Main, Hausen, Germany, assignors to Deutsche Gold- und Silber-Scheideanstalt vormals Roessler, Frankfurt am Main, Germany
No Drawing. Filed Aug. 19, 1965, Ser. No. 481,080
Claims priority, application Germany, Aug. 26, 1964, D 45,276
4 Claims. (Cl. 23—345)

ABSTRACT OF THE DISCLOSURE

Process for production of hydrides of Ti, Zr and Th which comprises reducing their oxides by heating in admixture with a mixture of (a) 10–25% of alkaline earth metal hydride and (b) alkali metal halide or a mixture of alkali metal and alkaline earth metal halides, the alkaline earth metal hydride being at least stoichiometric with respect to the oxide under exclusion of air to a temperature between about 350 and 750° C. to initiate the reaction and completing the reaction at 800 to 900° C. under exclusion of oxygen and recovering the hydride produced.

---

The present invention relates to an improved process for the production of hydrides of Ti, Zr and Th by reduction of their oxides.

It is known that the hydrides of Ti, Zr, W, Va, Th and Ta can be obtained by reduction of their halides with a mixture of potassium hydride and sodium hydride at temperatures between 100 and 400° C. under hydrogen or a noble gas atmosphere. This process starts from the halides of the metals in question as they possess a low melting point and in view of this have a tendency to react more easily. However, one of the disadvantages which must be taken into consideration is that in order that such process can be carried out it is first necessary to produce the metal halides which are not easily available commercially.

It furthermore is known, for example, to convert $TiO_2$, $ZrO_2$ or $SiO_2$ into the corresponding hydrides with the aid of calcium hydride of about 90–98% purity which is prepared by hydrogenation of technically pure Ca which always contains more or less Mg as impurity. As a result it is not possible to produce pure hydrides of Ti, Zr and Th by this process.

According to the invention pure hydrides of Ti, Zr and Th can be produced if their oxides are reduced at temperatures between about 350 and 750° C. with a mixture consisting of an alkaline earth metal hydride, preferably, calcium hydride and alkali metal halide and in some instances also alkaline earth metal halide obtained by reaction of water free alkaline earth metal halides with sodium or potassium or their alloys in contact with hydrogen at a temperature at which such reactants form at least a stirrable melt while preventing stratification of such melt during the course of the reaction. The preparation of such mixture is disclosed in U.S. application S.N. 137,984, filed Sept. 14, 1961, as well as in German Patent 1,160,830.

The Ti, Zr or Th hydride can be recovered from the reaction product in a known manner. It has been found advisable to effect the heating of the reaction mixture to the temperature indicated, namely, between about 350° C. and 750° C. as quickly as possible to avoid occurrence of impurities derived from the reaction vessel.

In order to attain as complete a conversion as possible it is advisable to give the reaction product an after heat treatment for about 1 to 2 hours at a temperature of about 800 to 900° C.

The composition of the starting mixture should be such that the calcium hydride or other alkaline earth metal hydride is present in a quantity which is at least stoichiometric with respect to the oxide of the metal which is to be converted to the hydride. It is possible to provide an excess of the alkaline earth metal hydride which, however, should be less than a 10% excess. Larger quantities of such hydride do not cause any further increase in the total Ti, Th or Zr content of the end product.

The starting mixtures of the alkaline earth metal hydrides only contain the hydride in quantities of about 10 to 25% and, preferably, only about 20% by weight. It was entirely unexpected that a solid phase reaction could be carried out with good yields despite the highly diluted state of the alkaline earth metal hydride and, furthermore, that especially pure hydrides could be obtained despite the presence of the other materials.

Very pure mixtures can be obtained by the process described in S.N. 137,984 as magnesium or other disturbing metallic component free calcium chloride and sodium, for example, are easily available as the starting materials therefor. A magnesium content, such as always occurs with other methods of preparation of calcium hydride, is not present in the calcium hydride containing mixtures employed according to the invention. As a consequence the hydrides obtainable according to the invention are also especially pure.

The hydrides produced according to the invention are obtained in yields of over 90%. Their particle size is very small and can be varied by corresponding appropriate selection of grain size in the starting mixture.

The hydrides produced according to the invention can be used as getters in radio apparatus.

In carrying out the conversion according to the invention the Ti, Zr or Th oxide employed, which are all easily available commercially, is first ground to a degree of fineness depending upon the grain size desired in the hydride produced therefrom. The alkaline earth metal hydride mixture is also finely ground and thereafter the two components are mixed with each other. The resulting starting mixture is then introduced into a crucible and heated under a hydrogen atmosphere until a temperature of about 300° C. is reached in the interior of such crucible. At this point a lively evolution of hydrogen commences which indicates the beginning of the reduction. As the reduction is exothermic, the heat supply may be cut down from this point on. When the reaction has proceeded through the entire reaction mixture, the temperature can slowly be raised to about 900° C. and held at such temperature for about 1 hour. Thereafter the reaction mixture is permitted to cool down under a hydrogen atmosphere. The resulting sintered cake of the reaction mixture can then be comminuted and processed, for example, with hydrochloric acid.

The following example will serve to illustrate the process according to the invention.

EXAMPLE

About 5 kg. of a $CaH_2$ containing mixture produced in a melt reaction from calcium chloride and sodium according to the above described process of U.S. application S.N. 137,984 were ground in an iron ball mill under nitrogen as a protective gas. A sample of the ground product was taken and analysed for its $CaH_2$ content (about 20%) and the corresponding quantity of zirconium oxide calculated therefrom. The latter was mixed with the ground $CaH_2$ containing mixture and the resulting mixture ground for 2 further hours in the ball mill again under nitrogen. The resulting finished reaction mixture was introduced loosely into a crucible which was located in a heatable reaction vessel which was sealable against the atmosphere. The reaction vessel was then sealed and evacuated and then filled with hydrogen. Then the reaction vessel was heated as rapidly as possible. After about 45 minutes when the walls of the reaction vessel had reached about 550° C. and the temperature within the crucible reached about 300° C., the reaction initiated which could be noticed by brisk cleavage of $H_2$. Thereafter the reaction vessel was heated at a lower rate and the temperature gradually raised to about 900° C. during the next 1–2 hours whereupon the reaction was completed to the center of the crucible. About 3½ hours after the heating was begun, the heating burners were turned off and the reaction mixture in the crucible permitted to cool. Before the reaction vessel was opened it was again evacuated and then filled with nitrogen. The reaction mixture which was in the form of a sintered cake was loosely held in the slightly conical crucible and was removed therefrom merely by turning over the crucible.

The crude reaction product was broken up and gradually introduced into 30 liters of distilled water while stirring. The resulting alkaline suspension was then acidified with 8 liters of concentrated HCl and the zirconium hydride permitted to settle and the supernatant liquid drawn off. The solid residue was then heated with 8 liters of 25% HCl for 2 hours at 95–100° C., the mixture diluted with 10 liters of hot distilled water and the mixture boiled up for a short time, the zirconium hydride permitted to settle and the supernatnat liquid drawn off. This procedure was repeated two further times. After such repeated extraction the residue was boiled up once with 8 liters of 3% HCl and then with 5% aqueous ammonia. The residue was then stirred up about 4–5 times, each time with about 2 liters of methanol, and allowed to settle and the supernatant liquid decanted. Thereafter the product was chlorine and ammonia free and was dried in air distributed in flat dishes. The yield from a series of such preparations as an average was 90% of theory.

We claim:
1. A method of producing a hydride selected from the group consisting of titanium, zirconium and thorium hydrides which comprises providing a pulverulant starting mixture essentially consisting of (1) an oxide of metal the hydride of which is to be produced and (2) a mixture consisting of (a) 10 to 25 wt. percent of an alkaline earth metal hydride and (b) alkali metal halide or alkali metal halide in admixture with alkaline earth metal halide, said alkaline earth metal hydride containing mixture having been produced by reaction of a water free alkaline earth metal halide with sodium or potassium or their alloys in contact with hydrogen at temperatures at which such reactants form at least a stirrable melt while preventing substantial stratification of such melt during the course of the reaction, the quantity of alkaline earth metal halide in the starting mixture being at least stoichiometric with regard to the metal oxide contained in the starting mixture, heating the mixture consisting of (1) and (2) under exclusion of air to a temperature between about 350 and about 750° C. to effect reaction between the alkaline earth metal hydride and the metal oxide, subsequently heating the reaction mixture to a temperature between about 800 and 900° C. under exclusion of air, cooling down the reaction mixture and recovering the hydride produced from the reaction mixture.

2. The process of claim 1 in which the quantity of alkaline earth metal hydride contained in the starting mixture is in excess of the stoichiometric quantity with regard to the metal oxide in the starting mixture, said excess being less than about 10%.

3. The process of claim 1 in which the alkaline earth metal hydride contained in mixture (2) is calcium hydride.

4. The process of claim 1 in which said heating of the starting and reaction mixture is effected under a hydrogen atmosphere.

References Cited

UNITED STATES PATENTS

| | | | |
|---|---|---|---|
| 2,427,338 | 9/1947 | Alexander | 23—204 |
| 2,427,339 | 9/1947 | Alexander | 23—204 |

CARL D. QUARFORTH, *Primary Examiner.*

S. TRAUB, R. L. GRUDZIECKI, *Assistant Examiners.*